March 8, 1927.
H. M. SYKES
AUTOMATIC FISHHOOK
Filed Dec. 30, 1922
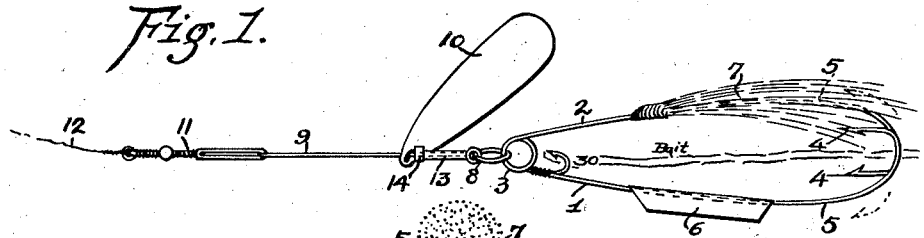
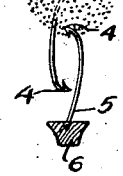
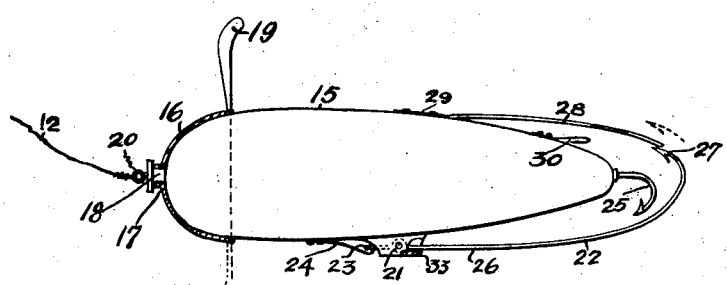
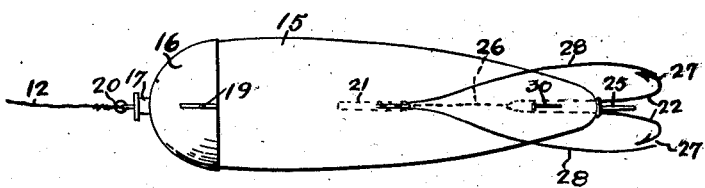
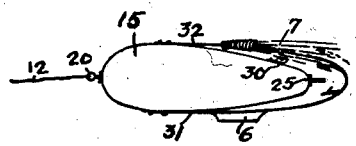
Howard M. Sykes, Inventor
H. S. Amstutz
By Attorney Patented Mar. 8, 1927.

1,620,497

UNITED STATES PATENT OFFICE.

HOWARD M. SYKES, OF VALPARAISO, INDIANA.

AUTOMATIC FISHHOOK.

Application filed December 30, 1922. Serial No. 609,826.

My invention relates to improvements in automatic fish hooks and it more especially consists of the features hereinafter pointed out in the annexed claims.

The purpose of my invention is to provide a plurality of fish hooks attached to a common support; that whether the hooks are in pairs side by side or opposite each other the barbs are so positioned as to be free from interference through entanglements with weeds, mosses, etc.; that also provides a detachable spinner; that combines a simulated fly with one form of hook; that in another form provides a depth gauging fin; that in either form provides means for attaching pork rind or other bait; and that in the case of a pair of oppositely positioned hooks makes provision for weighting the lower one of the hooks.

With these and other ends in view, I illustrate in the accompanying drawing such instances of adaptation as will disclose the broad underlying features without limiting myself to the specific details shown thereon and described herein.

Figure 1 is a side elevation of a pair of oppositely positioned hooks secured to a common support and supplied with a detachable spinner.

Fig. 2 is a transverse section of Fig. 1.

Fig. 3 is a side elevation partly in section of a buoyant body to which is attached a plurality of hooks positioned side by side, and a plurality of weed guards.

Fig. 4 is a plan view of Fig. 3.

Fig. 5 is a side elevation combining oppositely positioned hooks shown in Fig. 1 with the buoyant body shown in Fig. 3.

In practically carrying out my invention, I may use either form exemplified in Figs. 1 or 3, as in both cases the hooks when the fish strikes are pressed across the center line of the artificial bait so as to expose the barbs of the hook. In Fig. 1 the two hooks are pressed toward each other, thus bringing the barb of one hook outside the bend of the other hook and in Fig. 3 the hooks are similarly pressed so as to bring their barbs outside of the weed guards. In either case the result will be the same, i. e. the fish on striking exposes the barbs sufficiently to cause the hooks to become engaged with the interior of the fish's mouth. Both forms utilize spring pressed hooks which may be elastic on account of the inherent spring of the metal itself, as shown in Fig. 1, or due to a separate spring, as shown in Fig. 3. Though it is obvious that a pair of hooks, shown in Figs. 3 and 4, might be rigidly fastened at one end to the body and dependence placed on the natural spring of the wire composing the hooks; or a pair of hooks like those shown in Fig. 1 may be attached to a body as shown in Fig. 5. In the latter case the hooks will function the same as in Fig. 1 because of the natural elesticity of the steel wire from which the hooks are made.

In Fig. 1 the lower hook 1 and the upper hook 2 are joined together by a spiral 3 so that both hooks are formed of one piece of wire. Their barbed ends 4 terminate between the outer bends 5, thus completely protecting them against entanglement with weeds, etc. This is more especially shown in Fig. 2 wherein it will be seen that the barbs 4 are protected by the position of the bent portion 5. The lower hook 1 has a weight 6 attached to it and the upper hook 2 has an imitation fly 7 fastened to it. A split ring 8 is fastened to the spiral 3 and to the ring a straight wire pull 9 is attached in any suitable manner. On the wire 9 a spinner 10 of any desired form is placed. This spinner is free to revolve on the wire 9. Flexible connections 11 of any desired type join the line 12 with the wire 9. A sliding sleeve 13 with an anti-friction bead 14 may be placed loosely on the wire 9 between the spinner 10 and the split ring 8. The weight 6 in conjunction with fly 7 serves to hold the hooks 1 and 2 in vertical relation to each other.

In Figs. 3, 4 and 5 a buoyant body 15 is shown. This, in the main, takes the place of spiral 3 of Fig. 1. In Figs. 3 and 4 a cap 16 fits over the large end of the body 15 so that its hub 17 has frictional bearing on the projection 18. A fin 19 attached to the cap 16 serves to hold the body near the bottom of the stream when the fin is located as shown in full lines of Fig. 3. If the fin 19 is placed below the body, as shown in dotted lines of Fig. 3, the body will float near the surface of the water. A line 12 is secured to the body in a swivel manner at 20. The under side of the body has a pivot bearing 21 for the pair of hooks 22 joined to a single stem 26. An extension 23 of the stem 26 is pressed by the spring 24 which is secured to the body. The purpose of this is to return the hook 27 from the dotted line position to its normal location, shown in Fig. 3. A stationary hook 25 is fastened to the rear end of the body 15 between the hooks 22. These hooks are bent away from each other as shown in Fig. 4 and their barbs 27 terminate just inside of the weed guards 28. The guards 28 secured to the body at 29 serve to protect the hooks 22 and 25 from entanglement with weeds, etc. A separate hook 30 is secured to the body for the purpose of attaching a pork rind or other bait. The hooks 22 joined to the stem 26 are prevented from moving too far in one direction under the tension of the spring 24 by means of a stop 32.

In Fig. 5 the body 15 is supplied with a pork rind attachment 30, and a central hook 25 as in Figs. 3 and 4. The lower hook 31 is a substantial counterpart of the hook 1 shown in Fig. 1 and the hook 32 is a practical equivalent of the hook 2 shown in Fig. 1. An imitation fly 7 is attached to the hook 32 and a weight 6 is also attached to the hook 31. The hooks 31 and 32 are secured to the body 15 in any desired manner. The normal position of hooks 1, 2, 31, and 32 is maintained by reason of the rigidity of the wire from which they are formed. The wire, however, is elastic enough to permit of the hooks being pressed toward the center of the draught of the line 12 when the fish strikes and to again resume their normal position after the fish is detached. It is of course obvious that the spinner attachment of Fig. 1 may be equally applied to Figs. 3 and 5; and if desired, the imitation fly of Fig. 1 may also be used on Fig. 3. If for any reason it is desired to use the hooks without the spinner attachment the split ring 8 permits of its easy disengagement.

The operation of my automatic hook is simplicity itself. The dotted lines of Figs. 1, 3 and 5 show how the barbs are positioned when the fish strikes. It will be seen that my artificial bait is extremely simple, being entirely free from triggers, hair springs, fine adjustments, etc., etc., all of which constitutes a very practical and efficient requirement for any enthusiastic disciple of Isaak Walton.

What I claim is:

1. In automatic fish hooks, a floatable body, a line attachment at one end of the body, a plurality of hooks pivoted to the body at the other end, and spring actuating means for returning the hooks to their normal position.

2. In automatic fish hooks, a floatable body, a plurality of adjacently placed hooks in side by side spaced apart relation, a support in common for said hooks, and elastic means for simultaneously returning the hooks to their normal position.

3. In automatic fish hooks, a floatable body, a line attachment at one end of the body, a plurality of hooks, a common shank for said hooks, means for pivoting the shank on the under side of the body, means for returning the hooks to their normal position, and flexible weed guards secured to the top side of the body said guards terminating above and beyond the normal position of the barbed ends of the hooks.

In testimony whereof I affix my signature.

HOWARD M. SYKES